W. E. McDONELL.
OPHTHALMIC MOUNTING.
APPLICATION FILED AUG. 16, 1920.

1,371,385.

Patented Mar. 15, 1921.

INVENTOR.
William E. McDonell
BY
his ATTORNEYS

UNITED STATES PATENT OFFICE.

WILLIAM E. McDONELL, OF ROCHESTER, NEW YORK, ASSIGNOR TO E. KIRSTEIN SONS COMPANY, OF ROCHESTER, NEW YORK, A CORPORATION OF NEW YORK.

OPHTHALMIC MOUNTING.

1,371,385.  Specification of Letters Patent.  Patented Mar. 15, 1921.

Application filed August 16, 1920. Serial No. 404,022.

*To all whom it may concern:*

Be it known that I, WILLIAM E. McDONELL, a citizen of the United States, and resident of Rochester, in the county of Monroe and State of New York, have invented certain new and useful Improvements in Ophthalmic Mountings, of which the following is a specification.

The present invention relates to ophthalmic mountings and particularly to the type in which lens frames embody rings made of non-metallic material such as xylonite and connected by a bridge of the same material, an object of this invention being to provide for strengthening the bridge in such a manner that the latter will maintain its shape notwithstanding its being heated after it has been formed.

To this and other ends, the invention consists of certain parts and combinations of parts all of which will be hereinafter described, the novel features being pointed out in the appended claims.

Figure 1:
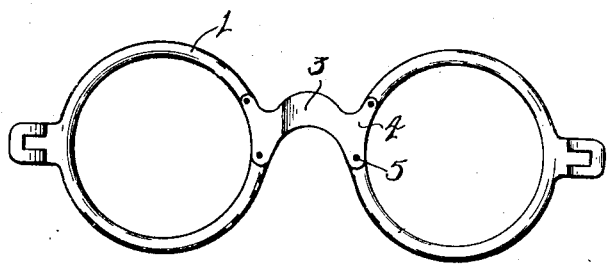
Figure 1 is a rear view of a mounting constructed in accordance with this invention.
Figures 2, 3:
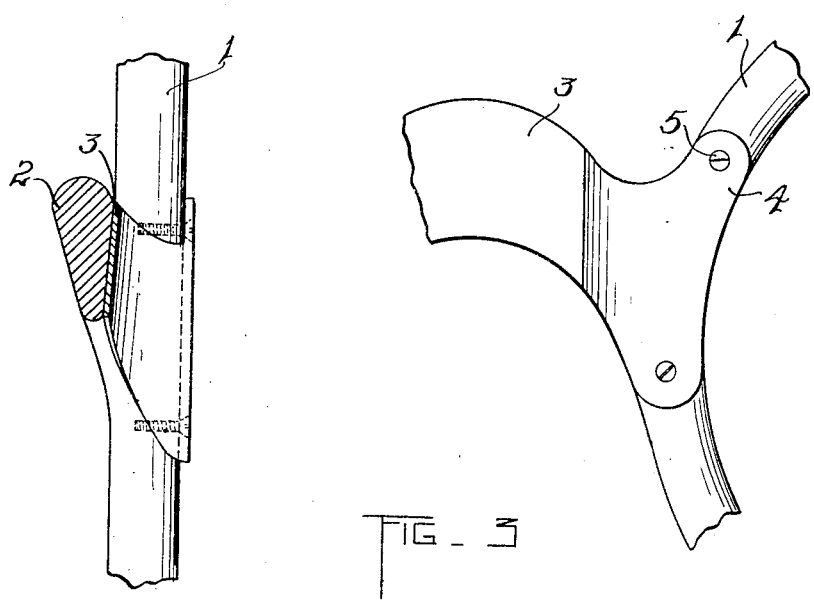
Fig. 2 is an enlarged central vertical section through the mounting.
Fig. 3 is an enlarged fragmentary view of the manner of connecting the reinforcing piece to the mounting.

When an ophthalmic mounting embodying lens frames made of non-metallic material such as xylonite and connected by a bridge of the same material is heated at the bridge, there is a tendency for the bridge to straighten out and lose its shape. According to this invention, means is provided which will prevent this distortion of the bridge.

In the illustrated embodiment of the invention, 1 indicates the lens frames or rings made of non-metallic material such as xylonite, and 2 the bridge connecting said frames and made of the same material. The feature of this invention is a bridge member connecting the non-metallic lens frames, and also acting to support or hold the bridge 2 in its molded form. This bridge member, in this instance, comprises a sheet metal plate 3 having enlarged ends 4 which are fastened by any suitable means, such as screws 5, to the lens frames or rings 1 adjacent the ends of the bridge 2. In this instance, this bridge member or support is provided with two screw openings at each end, and lies on the inner face of the non-metallic bridge 2 in close contact therewith to conform to such rear face, being substantially equal to the area of such rear face. This bridge member will maintain the shape of the non-metallic bridge notwithstanding the heating of the latter, and it will hold the lens frames at a definite distance from each other.

What I claim as my invention and desire to secure by Letters Patent is:

1. An ophthalmic mounting comprising lens frames embodying non-metallic rings, a bridge of non-metallic material connecting said frames, and means also connecting said non-metallic rings and acting to prevent the distortion of the non-metallic bridge under heat.

2. An ophthalmic mounting comprising a pair of lens frames embodying non-metallic rings, a non-metallic bridge connecting said rings, and a metallic bridge member connecting said rings.

3. An ophthalmic mounting comprising a pair of lens frames embodying non-metallic rings, a bridge of non-metallic material connecting said rings, and a metallic bridge member connecting the rings in rear of the non-metallic bridge and conforming to the rear face of said non-metallic bridge.

4. An ophthalmic mounting comprising lens frames embodying non-metallic rings, a non-metallic bridge connecting said rings, and a metallic bridge member having enlarged ends fastened to the rear faces of said non-metallic rings and lying in rear of said non-metallic bridge.

WILLIAM E. McDONELL.